United States Patent [19]

Temple

[11] 3,888,158
[45] June 10, 1975

[54] EXPLOSIVELY ACTUATED SEPARABLE CONNECTING DEVICE

[75] Inventor: Ernest E. Temple, Murrysville, Pa.

[73] Assignee: Mine Safety Appliances Company, Pittsburgh, Pa.

[22] Filed: Aug. 30, 1973

[21] Appl. No.: 392,958

[52] U.S. Cl.................................................. 89/1 B
[51] Int. Cl............................................. F42b 3/00
[58] Field of Search............... 89/1 B, 1.5 F; 85/1 R, 85/DIG. 1, 10 E

[56] References Cited
UNITED STATES PATENTS

| | | | |
|---|---|---|---|
| 2,455,826 | 12/1948 | Temple | 89/1 B X |
| 2,883,910 | 3/1959 | Nessler | 89/1 B X |
| 3,352,189 | 11/1967 | Brown | 89/1 B X |
| 3,449,996 | 6/1969 | Takahashi | 89/1 B X |
| 3,530,759 | 9/1970 | Francis | 89/1 B X |

Primary Examiner—Benjamin A. Borchelt
Assistant Examiner—C. T. Jordan
Attorney, Agent, or Firm—Brown, Murray, Flick & Peckham

[57] ABSTRACT

A breech-block is secured to the rear end of a barrel that has a front wall and that contains a piston normally spaced from the front wall. The breech-block and the front end of the barrel are provided with means for connecting the device between a support and a suspended load. The side of the barrel has an annular weakened area that will be fractured when the piston strikes the end wall of the barrel upon detonation of an explosive charge in the breech-block, whereupon the barrel will be separated into two parts.

2 Claims, 6 Drawing Figures

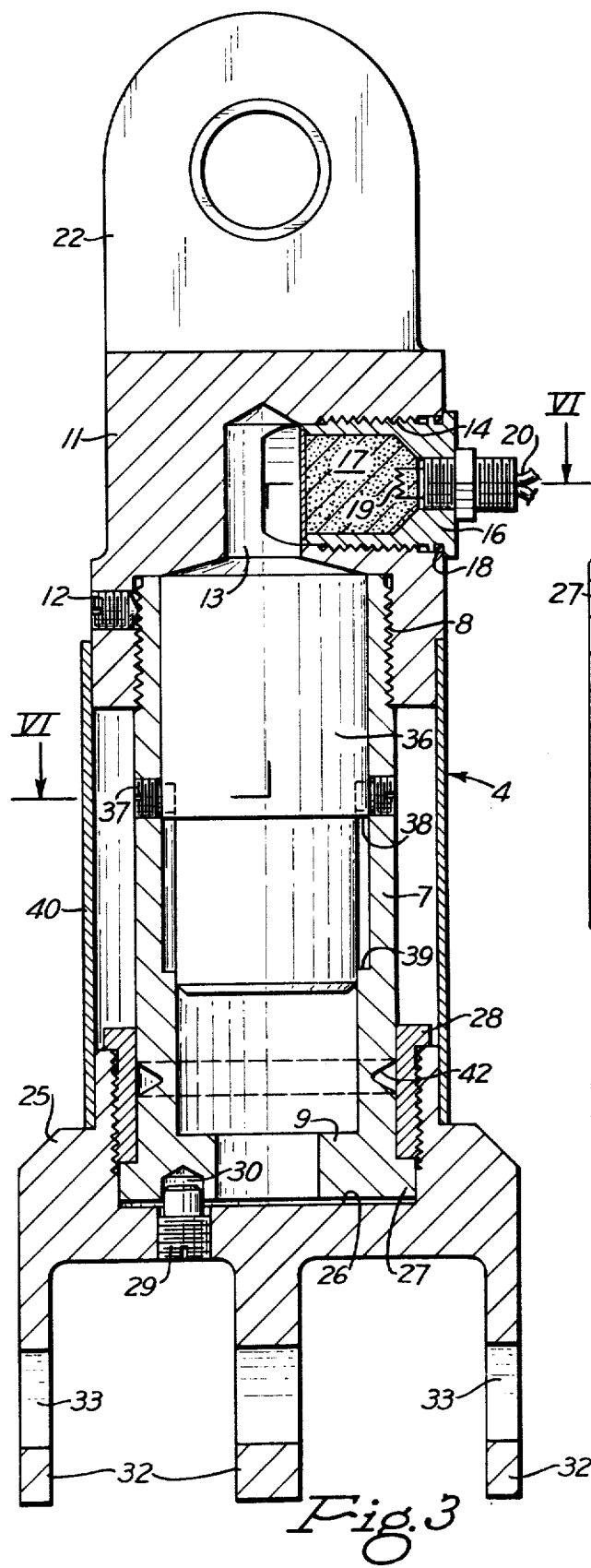
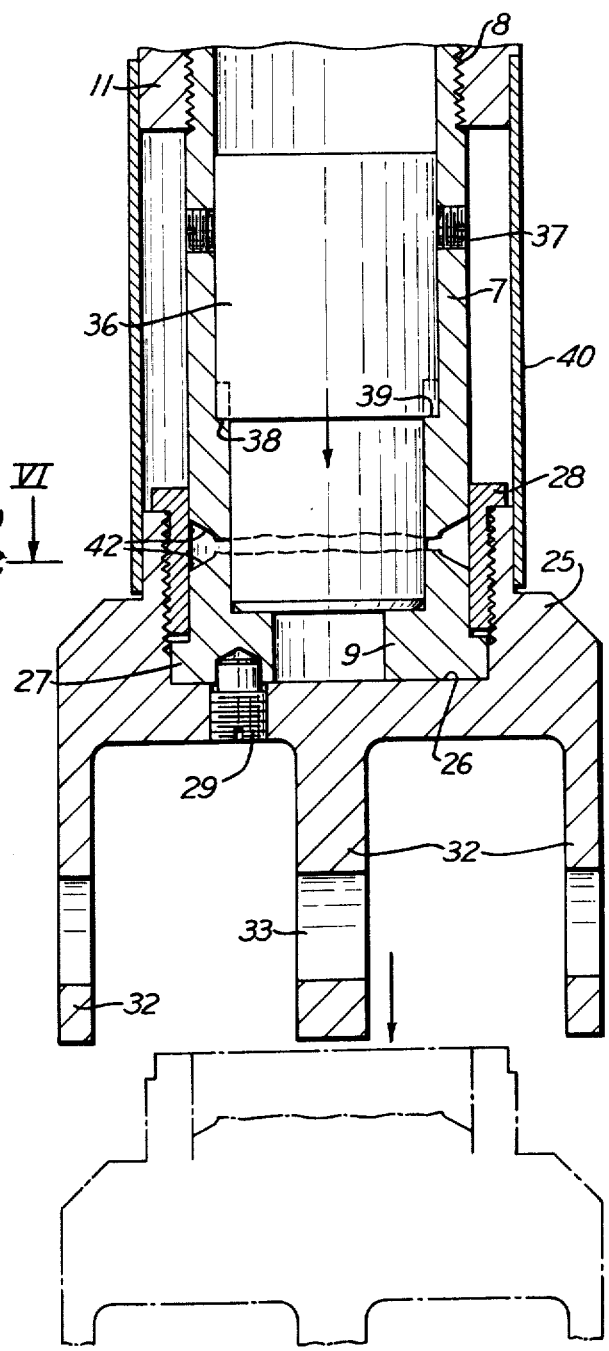
Fig.3
Fig.4

EXPLOSIVELY ACTUATED SEPARABLE CONNECTING DEVICE

There are situations in which it is desirable to suspend a load from a support and then to disconnect the load from the support by remotely operated means. One such situation is where a load is suspended by a cable or rigid means from a helicopter for transportation from a pickup location to a second location where the load is to be dropped or set down. In such a case it is desirable to be able to release the load quickly by means operated from within the helicopter. The "suspension" may also be more or less horizontally, such as when a vehicle, airborne or otherwise, is towing another vehicle or pulling a load, which it is desired to disconnect suddenly from the towing vehicle.

It is among the objects of this invention to provide a separable connecting device for temporarily suspending a load, which can be operated from a distance to quickly release the load, which is simple in construction, which is dependable in operation, which is relatively inexpensive and which is simple to use.

The preferred embodiment of the invention is illustrated in the accompanying drawings, in which FIG. 1 illustrates a helicopter carrying a suspended load exaggerated in size relative to the helicopter;

FIG. 3 is a longitudinal section taken on the line III—III of FIG. 2;

FIG. 4 is a fragmentary longitudinal section similar to FIG. 3, but showing the device separating;

Figure 1:
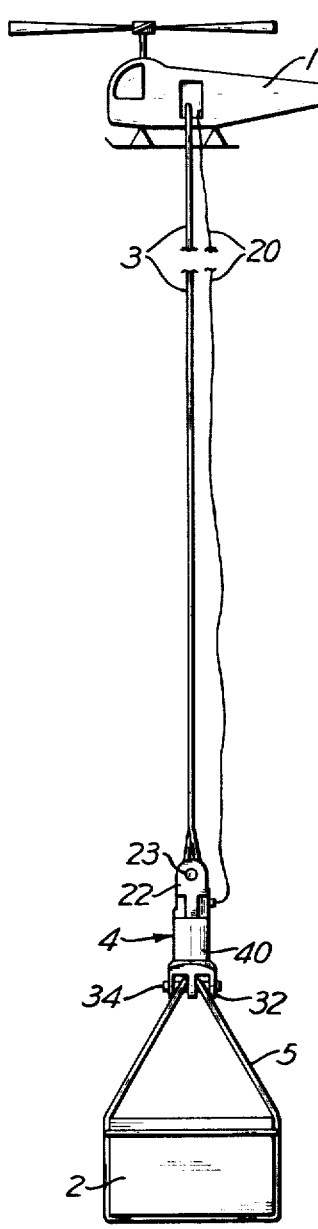
Figure 2:
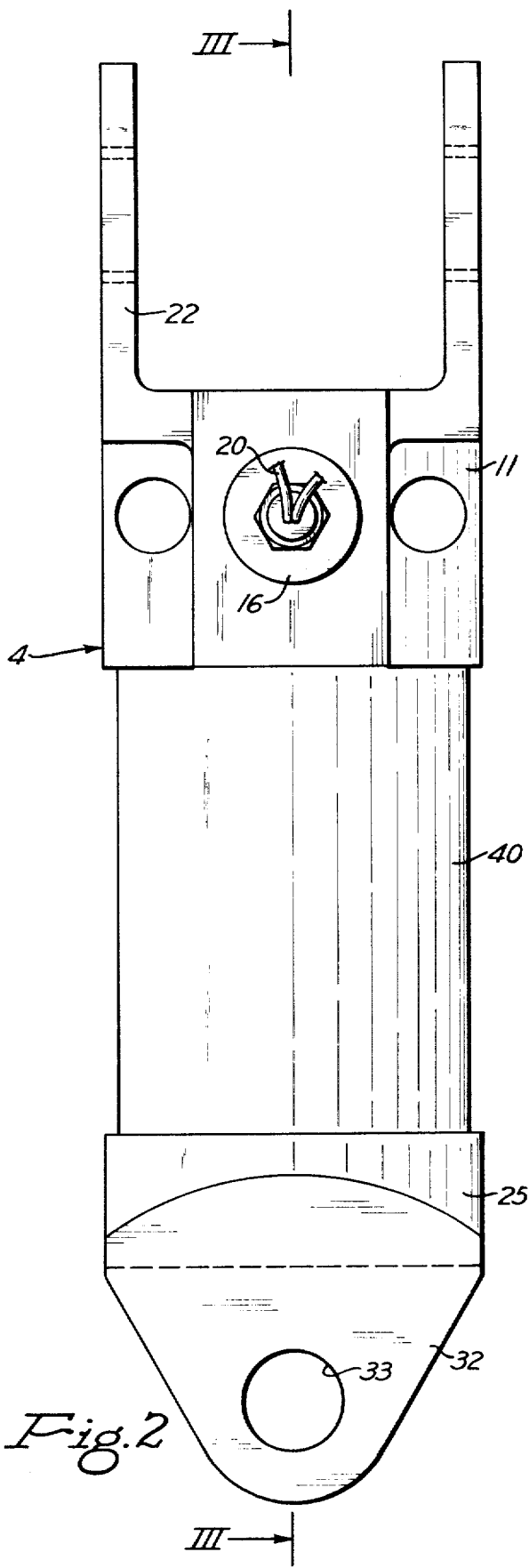
FIG. 2 is an enlarged side view of the connecting device turned 90° from its position in FIG. 1.
Figure 5:
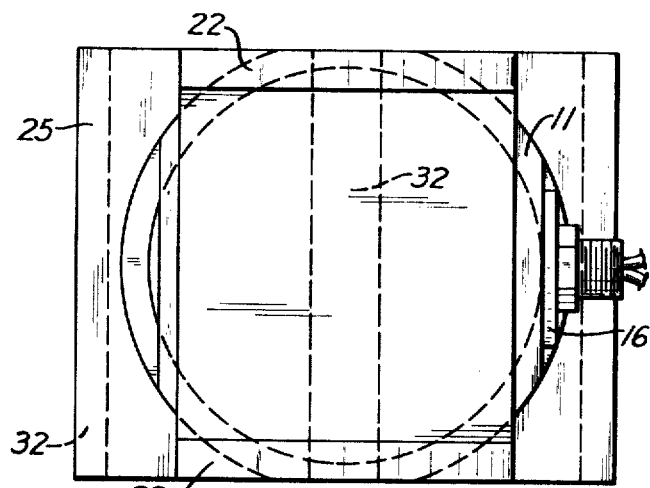
FIG. 5 is a view of the upper end of the connecting device.
Figure 6:
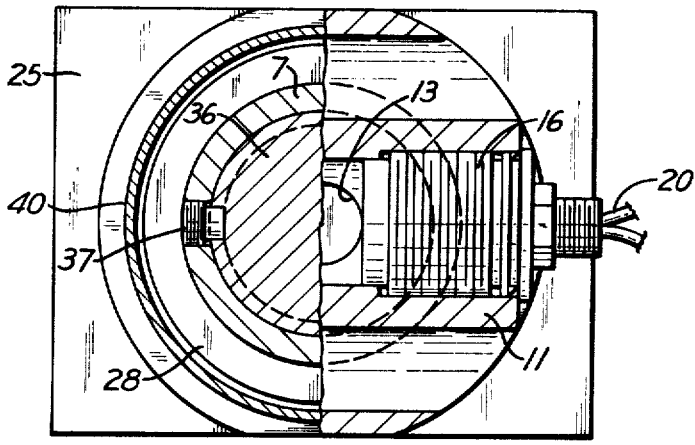
FIG. 6 is a cross section taken on the line VI—VI of FIG. 3.

Referring to FIG. 1 of the drawings, a helicopter 1 is shown carrying a load 2 suspended from it by a cable 3, the separable connecting device 4 of this invention, and a sling 5. The connecting device, shown in more detail in FIGS. 3 and 6, includes a barrel 7 provided with external screw threads 8 at its rear or upper end and with an end wall 9 at its front or lower end. The upper end of the barrel has an opening in it; preferably, it is wide open as shown. Screwed onto the upper end of the barrel is a recessed breech-block 11 that is locked in place by a set screw 12. The breech-block is provided with an axial passage 13 that extends rearwardly or upwardly from the barrel, but only part way through the block. A radial passage 14 in the breech-block connects with the side of the axial passage and is internally threaded to receive a threaded cartridge 16 containing an explosive charge 17. A sealing ring 18 between the cartridge and the encircling breech-block prevents water from entering the block in case this device is used under water. The outer end of the cartridge may contain a percussion-type primer that may be struck by conventional mechanical firing means operated by a flexible line from a distance or, preferably, as shown in FIG. 1 the cartridge may include an electrical resistance wire 19 connected by an electric cable 20 with a battery and switch in the helicopter. When the switch is closed, the resistance wire is heated to detonate the explosive charge.

The breech-block 11 is provided with means, such as a pair of lugs 22, that may receive a pin 23 (FIG. 1) by which the connecting device is suspended from the lower end of cable 3.

Means are attached to the front or lower end of the barrel for connecting it to load supporting sling 5. As shown in FIG. 3, these means may include a connecting member 25 provided with a socket 26 that receives the front end portion of the barrel. The front end of the barrel is provided with a radial flange 27, above which an externally threaded nut 28 encircles the barrel and is screwed into the connecting member socket. The nut rests upon the radial flange and is supported by it. The space between the nut and the front wall of socket 26 forms a recess that is deeper than flange 27 so that the front end of the barrel can be spaced a short distance from the front of the socket. The barrel and connecting member 25 may be prevented from turning relative to each other by means of a pin 29 threaded in the connecting member and projecting into a shallow bore 30 in the front end of the barrel. The same result would be accomplished by mounting the pin in the barrel and providing the connecting member with the pin-receiving bore.

The front or lower end connecting member 25 may be provided with two or more laterally spaced and downwardly projecting lugs 32 having axially aligned holes 33 therethrough. As shown in FIG. 1, a pin 34 in those holes supports sling 5 and the load.

Slidably mounted inside the barrel is a piston-like hammer 36 that normally is held in the upper end portion of the barrel by means of one or more shear screws 37 threaded in the side of the barrel and projecting into openings in the side of the piston. The lower end portion of the piston is reduced in diameter to form a downwardly facing annular shoulder 38 normally spaced from an upwardly facing shoulder 39 in the barrel. These shoulders limit the distance that the piston can move down in the barrel, but they are spaced far enough apart initially to allow the piston to be moved forward into engagement with the front wall 9 of the barrel before the shoulders come together. The inner ends of the breech-block and front end connecting member 25 may be encircled by the ends of a guard sleeve 40 that also encircles the barrel.

It will be seen that this connecting device serves as a link, in the example illustrated, connecting the cable suspended from the helicopter and the sling that supports the load below. It is a feature of this invention that this link or connecting device can be quickly separated into two parts by remote control so that the load can be released from the helicopter. Accordingly, the barrel is provided with an annular weakened area, preferably created by an external or circumferential groove 42 that reduces the thickness of the side wall of the barrel. However, enough metal is left in this area of reduced wall thickness to support any load within the designed capacity of the connecting device. It is best to locate the groove inside the nut 28 so that there is no chance of the barrel being bent at the groove. Other ways of forming a weakened area could be used, such as providing the barrel with a ring of radial holes.

OPERATION

When the load 2 has been carried to the location where it is to be dropped or set down, the cartridge is fired by someone in the helicopter and the force of the explosion builds up behind the piston until it is great enough to cause the piston to shear off the shear screws 37, whereupon the piston is driven down at high speed and strikes the front wall 9 of the barrel with such force that the barrel is broken in two at the base of its encircling groove 42 as shown in FIG. 4. During this breakaway, the front portion of the barrel is driven down in socket 26 until it strikes the front wall of socket 26.

If the load is hanging from the connecting device at the moment the cartridge is fired, separation of the barrel in this way will release the load from the helicopter and the load will drop. On the other hand, if the helicopter first sets the load down on the ground, separation of the connecting device will permit the helicopter to ascend immediately without lifting the load.

Since the piston is held captive in the barrel, due to its downward travel being stopped by engagement of shoulder 38 with shoulder 39, the high pressure gases and the flame due to the explosion are retained in the barrel.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A separable connecting device for temporarily suspending a load from a support, comprising a barrel having a front wall and an opening in its rear end, the front end of the barrel being provided with a radial flange, a breech-block secured to said rear end and provided with a passage communicating with the rear end of the barrel, said passage being adapted to hold an explosive charge, a piston normally located in the rear end portion of the barrel but movable forward into engagement with said front wall, and means for connecting the breech-block and the front end of the barrel with a support and load, said front end connecting means being provided with a socket having an annular recess in its side wall of greater depth than said flange, said recess receiving said flange for limited axial sliding movements of the barrel relative to said front end connecting means, the side of said barrel being provided with an annular weakened area that will be fractured when the piston strikes said end wall upon detonation of said charge, whereby the barrel will separate into two parts and the front part will be driven forward relative to said front end connecting means.

2. A separable connecting device according to claim 1 in which the side wall of said socket engages the barrel behind said recess, and said weakened area is located between said flange and the rear end of said socket wall.

* * * * *